United States Patent
Molenaar

(10) Patent No.: US 7,927,017 B2
(45) Date of Patent: Apr. 19, 2011

(54) LOWER A-FRAME BUSHING ASSEMBLY

(75) Inventor: Kelly Molenaar, Kalamazoo, MI (US)

(73) Assignee: Howe Racing Enterprises, Beaverton, MI (US)

( * ) Notice: Subject to any disclaimer, the term of this patent is extended or adjusted under 35 U.S.C. 154(b) by 589 days.

(21) Appl. No.: 12/008,845

(22) Filed: Jan. 15, 2008

(65) Prior Publication Data
US 2008/0175525 A1   Jul. 24, 2008

Related U.S. Application Data

(60) Provisional application No. 60/881,616, filed on Jan. 22, 2007.

(51) Int. Cl.
*F16C 23/04* (2006.01)
(52) U.S. Cl. .................... 384/192; 384/214
(58) Field of Classification Search .......... 384/192–214, 384/276, 286–295, 322, 372, 373, 396–399, 384/428, 438, 439, 903; 280/124.13, 124.175, 124.143, 124.144, 86.756
See application file for complete search history.

(56) References Cited

U.S. PATENT DOCUMENTS

| | | | | |
|---|---|---|---|---|
| 1,474,057 A * | 11/1923 | Pridemore | ................. | 384/396 |
| 2,444,214 A * | 6/1948 | Whitcman | ................. | 384/396 |
| 2,974,986 A * | 3/1961 | Hazard | ................. | 403/76 |
| 3,241,893 A * | 3/1966 | Haller | ................. | 384/279 |
| 6,325,544 B1 * | 12/2001 | Sasaki et al. | ................. | 384/192 |
| 7,172,352 B2 * | 2/2007 | Close et al. | ................. | 384/192 |

* cited by examiner

*Primary Examiner* — Thomas R Hannon
(74) *Attorney, Agent, or Firm* — Robert L. McKellar; McKellar IP Law, PLLC

(57) ABSTRACT

Bearing assembly that is of integral construction or manufacture and is capable of internal lubrication. The all metal construction gives a long lasting, easily installable, easy to lubricate, smooth ride bushing assembly.

2 Claims, 4 Drawing Sheets

LOWER A-FRAME BUSHING ASSEMBLY

This application claims benefit of the priority of Provisional patent application Ser. No. 60/881,616, filed Jan. 22, 2007.

The present invention is a lower A-frame bushing assembly for automobiles having an integral construction and which is capable of receiving lubrication. "Integral" for purposes of this invention means composed of constituent parts making a whole as defined in Webster's Third New International Dictionary, G&C Merriam Co. 1965.

BACKGROUND OF INVENTION

Lower A-frame bushing assemblies are not new to the art. However, none of the prior art devices combine the integral construction of the instant device along with the ability of the bushing assembly to be internally lubricated. Bushing assemblies are standard equipment on vehicles in an effort to control suspension, eliminate vibration and noise. This bushing assembly involves the incorporation of three members that are capable of relative motion therebetween the members.

THE INVENTION

Thus, this invention deals with a lower A-frame bushing assembly comprising in combination a bearing housing, a bearing insert, a bushing and a retention ring.

The bearing housing has a near end, a distal end, an outside surface, an inside surface, an internal opening through the near end to the distal end, a portion of the said inside surface being circumferentially grooved for retention of a retaining ring therein, said retaining ring securing the bushing insert within the bushing housing, The bearing insert has a bearing insert near end, a bearing insert distal end, a bearing insert internal opening, a bearing insert inside surface, a bearing insert outside surface, an opening through said bearing insert inside surface to said insert bearing outside surface, said bearing insert internal opening having a near end and a distal end.

There is a bushing having a bushing near end, a bushing distal end, a bushing outside surface, a bushing inside surface, an opening through said bushing from the bushing near end to the bushing distal end and a second opening through the bushing inside surface extending through to the bushing outside surface.

The bushing outside surface lays inside the bearing insert inside surface, said bearing insert outside surface laying inside the inside surface of said bushing housing and being retained within said bearing housing by the retention ring inserted into the circumferential groove.

DETAILED DESCRIPTION OF THE DRAWINGS

Figure 1:
FIG. 1 is a full side view of the device of this invention.
Figure 2:
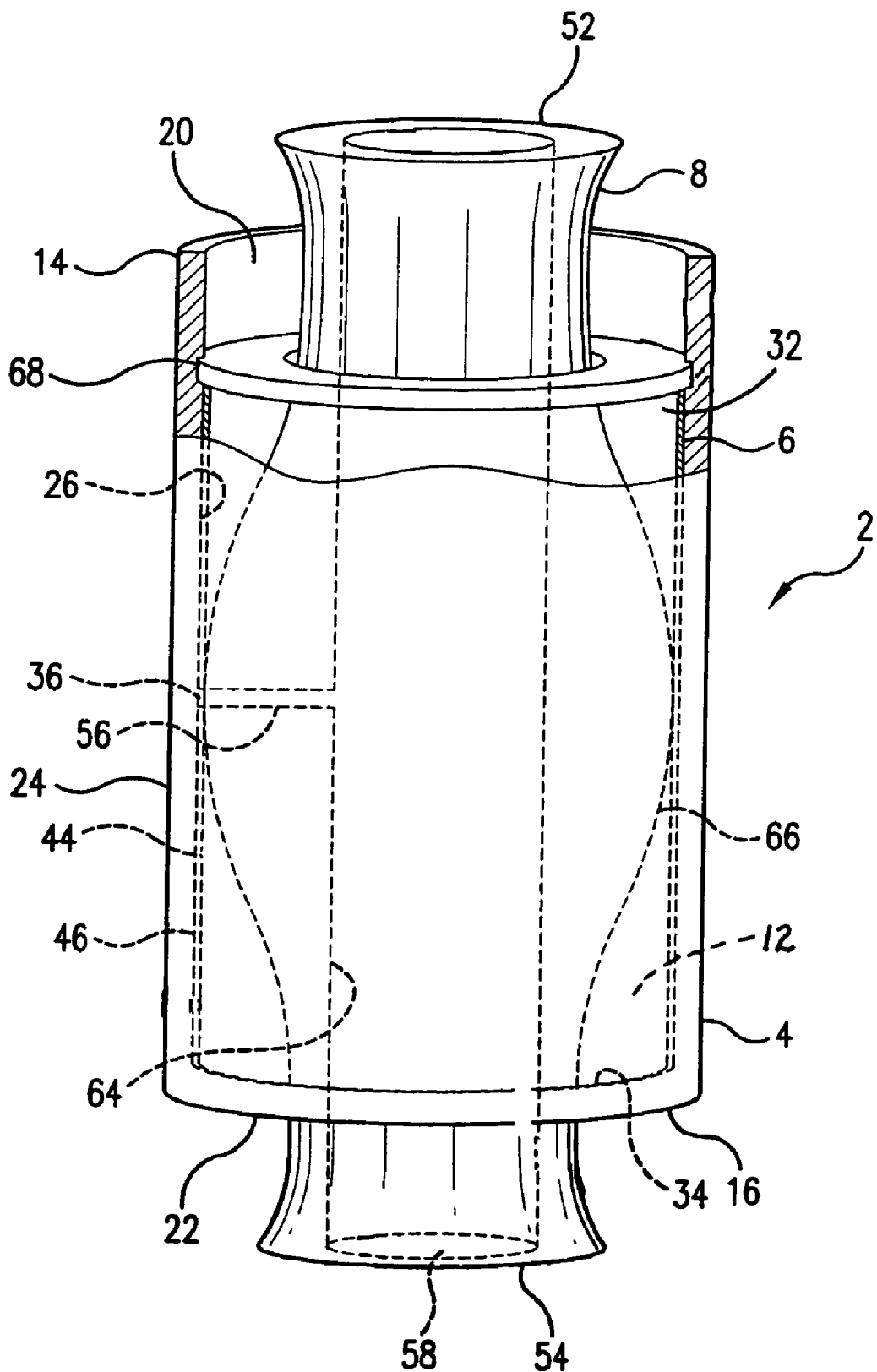
FIG. 2 is a cross sectional side view of the device of FIG. 1 through line A-A with the exception that the retainer ring is set forth in its entirety.

FIG. 1 is a full side view of a device of this invention and FIG. 2 is a full cross sectional view of the device of FIG. 1 through line A-A showing an internal view of the bushing assembly 2. FIG. 1 shows the bushing assembly 2, the bushing housing 4 and the bearing 8. FIG. 2 shows the bushing housing 4, the bearing 8 and the internal bushing 6. All are held in place via the retaining ring 68. Also shown is the internal bearing 8 which is connected to the vehicle. The bearing 8 is placed inside of the insert 6 and attached. This is then placed within the bushing housing 4 and secured within that housing via the retention ring 68.

Figure 3:
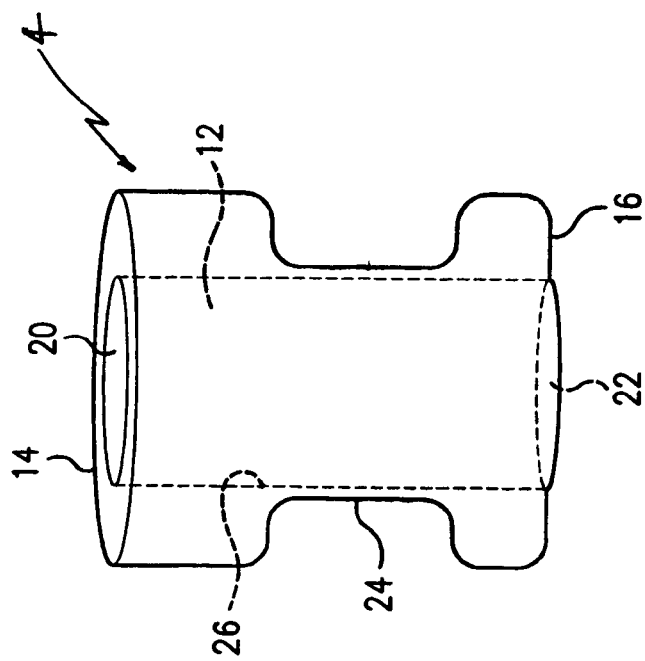
FIG. 3 is a full view of one embodiment of the bearing housing.

FIG. 3 is a full side view of one embodiment of the bearing housing 4. This FIG. 3 shows the near end 14 and the distal end 16. It also shows the internal opening 12. Both the near end 20 and distal end 22 of the internal opening 12 are shown. The inside surface 26 of the opening therethrough and the outside 24 are also shown.

Figure 4:
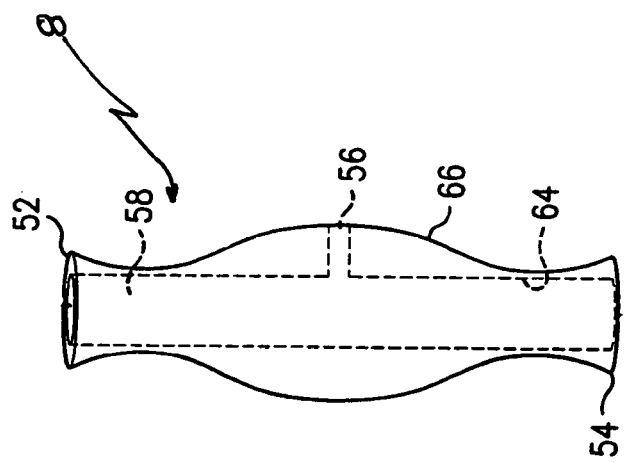
FIG. 4 is a full view of one embodiment of an internal bushing.

FIG. 4 is a full side view of one embodiment of a bearing 8. The bearing 8 has a near end 52 and a distal end 54. The bearing 8 also has an opening 58 through it extending from the near end 52 to the distal end 54. There is also a second opening 56 that extends from the inside surface 64 through to the outside surface 66. This opening 56 facilitates the lubrication of the bearing 8.

Figure 5:
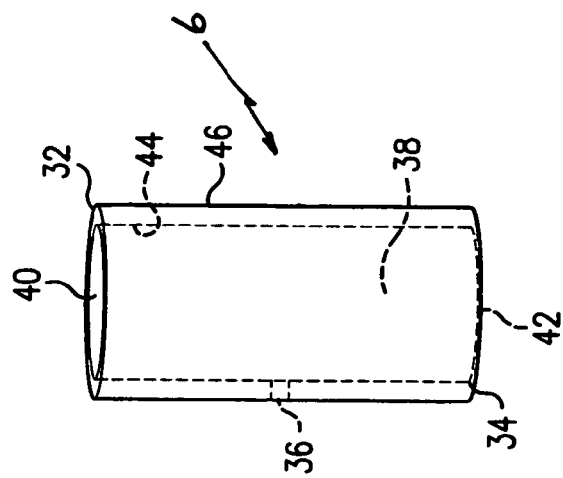
FIG. 5 is a full view of one embodiment of the bushing insert.

FIG. 5 is a full side view of one embodiment of the bushing insert 6. The insert 6 has a near end 32 and a distal end 34. Also shown is an opening 38 through it extending from the near end 32 through to the distal end 34 of the bushing insert 6. There is also a second opening 36 through it that extends from the inside surface 44 to the outside surface 46 for the purpose of lubrication.

Figure 6:
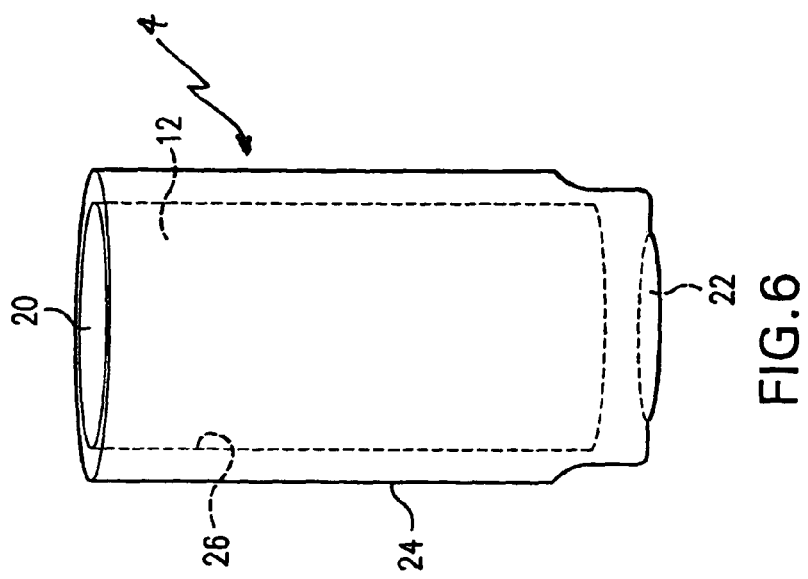
FIG. 6 is a full view of another embodiment of this invention showing a bearing housing with a different outside configuration.

FIG. 6 is a full view of a bearing housing of this invention showing a near end 20 and a distal end 22 with an internal opening 12, bearing housing 4, outside surface 24 and inside surface 26.

Figure 7:
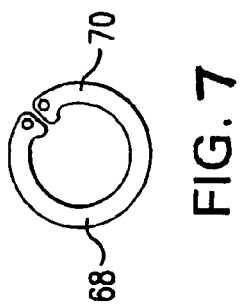
FIG. 7 is a full top view of a standard retaining ring.

FIG. 7 is a full top view of a standard retaining ring 68. The retaining ring 68 has a top surface 70 and an opposite bottom surface 72 (not shown).

Figure 8:
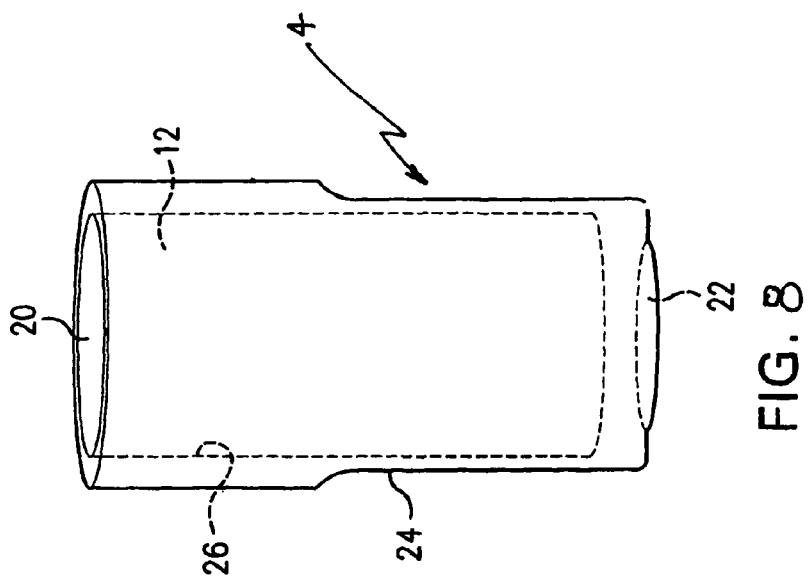
FIG. 8 is a full view of another embodiment of the bearing housing showing yet another outside configuration for the bearing housing.

FIG. 8 is a full view of another embodiment of the bearing housing 4 of this invention. The bearing housing 4 has a near end 20 and a distal end 22. The bearing housing 8 also has an opening 58 through it extending from the near end 20 to the distal end 22.

FIGS. 3, 6, and 8 show various outside surface configurations used for various sizes of lower A-frame assemblies.

What is claimed is:

1. A lower A-frame bushing assembly comprising in combination a bearing housing, a bearing insert, a bushing and a retention ring that are integral, said bearing housing having a near end, a distal end, an outside surface, an inside surface, an internal opening through the near end to the distal end, a portion of the said inside surface being circumferentially grooved for retention of a retaining ring therein, said retaining ring securing said bushing within the bushing housing, said bearing insert having a bearing insert near end, a bearing insert distal end, a bearing insert internal opening, a bearing insert inside surface, a bearing insert outside surface, an opening through said bearing insert inside surface to said insert bearing outside surface, said bearing insert internal opening having a near end and a distal end, said bushing having a bushing near end, a bushing distal end, a bushing outside surface, a bushing inside surface, an opening through said bushing from the bushing near end to the bushing distal end and a second opening through the bushing inside surface extending through to the bushing outside surface, said bushing outside surface laying inside said bearing insert inside surface, said bearing insert outside surface laying inside the inside surface of said bushing housing and being retained within said bearing housing by said retention ring inserted into the circumferential groove.

2. A bushing assembly as claimed in claim 1 wherein, said bushing and insert are held within the confines of the bearing housing.

\* \* \* \* \*